Figures 1, 2:
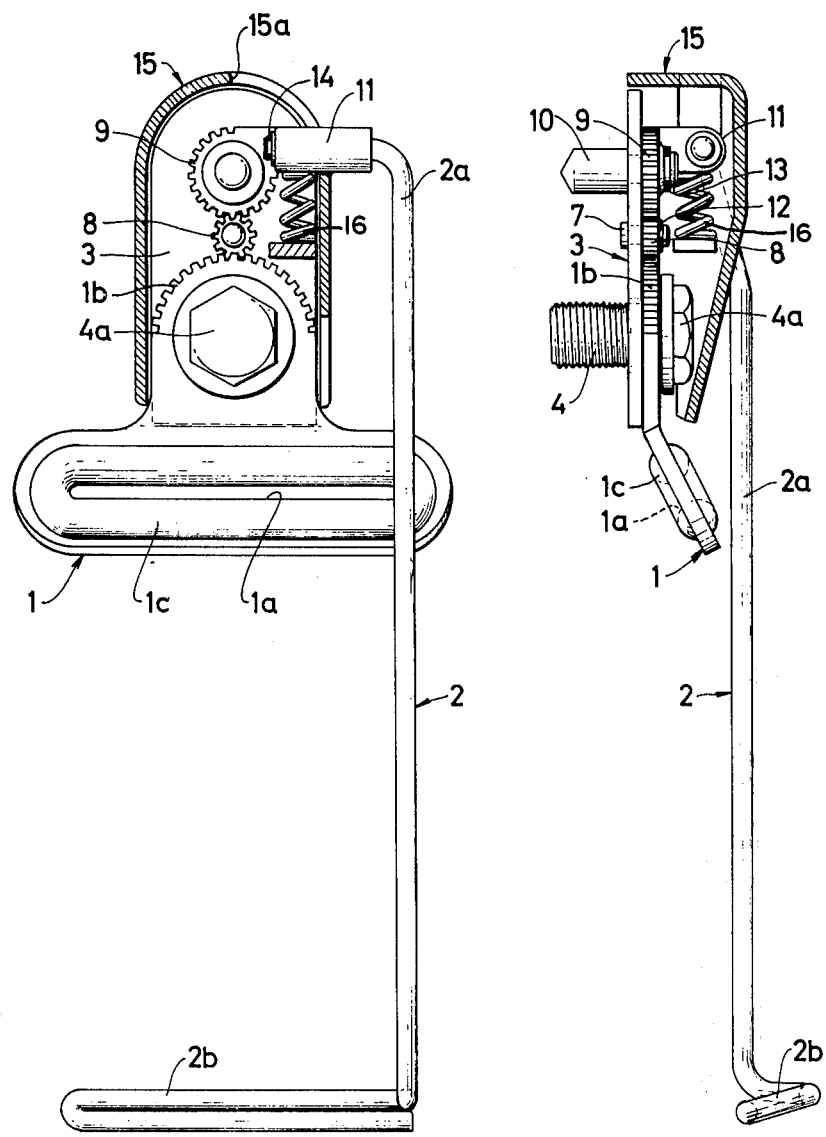

United States Patent [19]

Lindblad

[11] 4,033,594
[45] July 5, 1977

[54] DEFLECTION DEVICE FOR SAFETY BELTS FOR VEHICLES PROVIDED WITH BAND COLLECTING MEANS

[76] Inventor: Oskar Lennart Lindblad, Hedasgatan 16, 440 20 Vargarda, Sweden

[22] Filed: Jan. 8, 1976

[21] Appl. No.: 647,519

[30] Foreign Application Priority Data

Jan. 10, 1975 Sweden .............................. 7500246

[52] U.S. Cl. .................................. 297/389; 24/164
[51] Int. Cl.² ......................................... A47B 35/00
[58] Field of Search ................. 297/389, 385, 388; 280/744, 745, 747; 24/164

[56] References Cited

UNITED STATES PATENTS

| | | | |
|---|---|---|---|
| 3,618,975 | 11/1971 | Bombach | 297/389 |
| 3,831,971 | 8/1974 | Kaneko | 280/745 |
| 3,850,446 | 11/1974 | Hogenson | 280/744 |

FOREIGN PATENTS OR APPLICATIONS 1,196,700  7/1970  United Kingdom ............... 297/389

*Primary Examiner*—James T. McCall

[57]           ABSTRACT

A deflection device for a safety belt in a vehicle with a support for connection to the side of the vehicle, a deflection bar pivotal relative to the support and a safety belt holder supported in spaced relationship to the reflection bar, and a pivot arrangement between the holder and the deflection bar such that upon pivoting of the holder the deflection bar pivots in the same direction but to a lesser extent than the holder.

5 Claims, 4 Drawing Figures

DEFLECTION DEVICE FOR SAFETY BELTS FOR VEHICLES PROVIDED WITH BAND COLLECTING MEANS

The present invention relates to a deflection device for safety belts for vehicles provided with band collecting means, the safety belts preferably being of the three-point type and intended for mounting in the upper portion of the lateral door post of the vehicle or other corresponding element, and through which device the band part of the safety belt, starting from the collecting means, is intended at the passage to the chest part to run over a deflection bar or similar element.

It is a principal object of the invention to improve the accessibility of the band of the safety belt, when it is put on. In connection with deflection devices of the kind in question of the prior art it has been very difficult to reach the band of the belt, when the belt is put on, expecially in vehicles with long doors, which usually is the case in connection with vehicles with only two lateral doors, which shall serve for entrance and alighting in and out respectively of the front seat as well as the back seat.

Said object is reached by means of a deflection device according to the invention, which substantially is characterized by in addition comprising a holder supported at a distance from the deflection bar, through which holder the chest part of the band in mounted condition of the safety belt is carried, so that it can run freely, the holder in inactive condition of the safety belt being supported in a forward position at a distance from the deflection bar by means of devices, which permit a movement from this position preferably against the bias of a spring.

Figure 3:
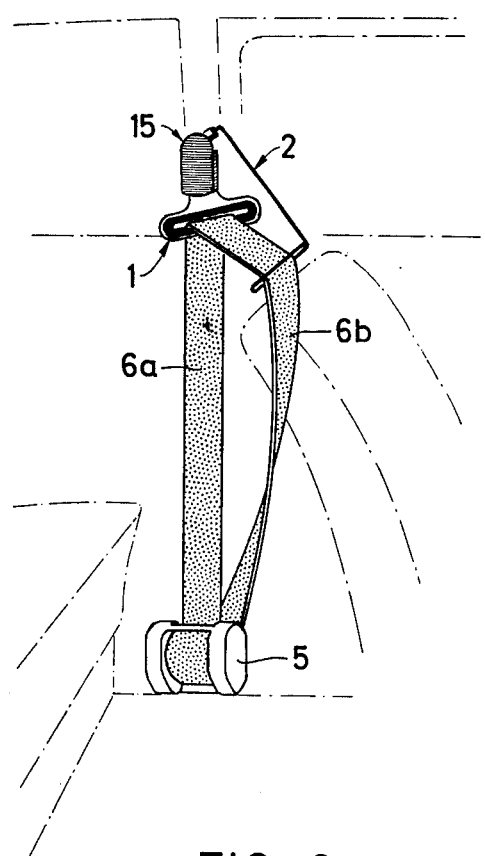
Figure 4:
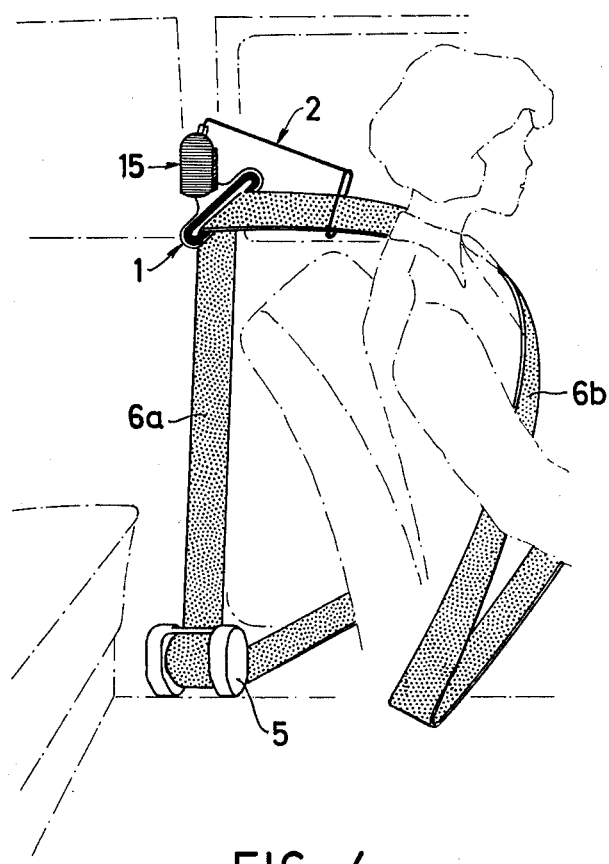

In the following an example of an embodiment of the invention is described, reference being made to the accompanying drawing, in which FIG. 1 is a view of the deflection device in question as seen from the inside of the vehicle in direction towards its lateral wall (not shown), the covering cap of the deflection device for clarity's sake being broken away, FIG. 2 is a view as seen from the left in FIG. 1, FIG. 3 is a view of the device illustrated in the previous figures being in the position, where it normally is, when the safety belt is not in use, and FIG. 4 is a figure corresponding the FIG. 3, the deflection device being in the position it occupies, when the safety belt is in use.

The device illustrated in the drawings comprises three main parts, viz. a loop shaped running in its entirety indicated with 1, a guiding part in its entirety indicated with 2, and a bearing and fixing plate indicated with 3. In mounted condition the device is attached by means of a bolt 4, which thus is pivotable substantially in its own plane and consequently also along the side of the vehicle in question. In order to permit that the band part 6a starting from a band collecting means 5 located in a low portion of the side of the vehicle shall run freely from the side of the vehicle, the loop shaped portion of the running part 1 bent somewhat inwards. Said loop shaped portion has a running slit 1a, the edges of which are clad with a comparatively smooth material, which contributes to the easy sliding of the band and to the same being subjected to the least possible wear. At the top the running part 1 is provided with a toothed segment 1b, which via an intermediate gear wheel 8, rotatably mounted on a pivot pin riveted to the fixing plate 3, is in driving connection with a corresponding toothed segment 9 on the holder part 2. The toothed segment 9 is pivotably mounted on a pin 10 which extends into a bore (not shown) in the side of the vehicle for the fixation of the plate 3. The holder part 2 comprises an arm 2a, of which one end portion is bent at an angle and pivotably mounted in a bearing sleeve 11 supported by the toothed segment 9, the axis of said sleeve extending at right angle to the pivoting axis 10 of the toothed segment 9. On the side of the respective shafts and pins, which is in opposite position relative to the plate 3, the running part is locked by means of the head 4a of the screw 4, while the intermediate gear wheel 8 is locked by means of a circlip 12, which is snapped into a groove made in the pin 7, and the toothed segment 9 is locked by means of a circlip 13, which also is introduced into a groove made in the pin 10. In the same manner the end portion of the arm 2a is locked in the sleeve 11 by means of a snap ring 14. The holder part 2 at its other end passes to a section, which is bent to form a holder 2b, through which the band of the belt can slide. The holder 2b is open along one of its sides, so that it is not necessary to thread the band through the same, but it can be moved into the holder from its side. However, the bending is made in such a manner that the band cannot fall out of the holder by itself. When the holder part 2 is pivoting in one direction or the other the running part 1 follows the movement in the same direction. On account of the toothed segment 1b exhibiting a radius, which is greater than the radius of the toothed segment 9 (in the embodiment shown the radius of the toothed segment 1b is twice as great as the radius of the toothed segment 9) the running part 1 will pivot at a slower pace than the holder part 2, i.e. in the embodiment shown the deflection of the holder part 1 will be half as great as the pulling out of the holder part 2. The movable parts are spring-loaded by a spring 16 towards the pivoting position illustrated in FIG. 3, out of which position they consequently can be brought, suitably against the bias of a spring action. Due to the fact that the device tends to occupy the position illustrated in FIG. 3, when the safety belt is not in use, the band of the belt is kept so far in forward direction that it is easy to grip it in connection with the putting in operation of the safety belt. When someone is going to enter into the back seat of the vehicle, the person in question with one of his hands can move aside the holder part 2 to the position illustrated in FIG. 1, whereby the passage will be unobstructed. In the condition of use of the safety belt illustrated in the FIG. 4 the holder device 2 is pivoted somewhat further in upward direction. A cap covering the toothed segments 9, 1b, and the gearwheel 8 is indicated with 15, said cap in its side having an opening 15a, through which the sleeve 11 extends, and in which the same is movable.

The invention is not limited to the embodiment described above by way of example only, but can be varied as to its details within the scope of the following claims. In the embodiment shown one has used a collecting means comprising a band reel of conventional type, but the device is of course also applicable in connection with other types of collecting devices.

I claim:

1. A deflection device for a safety belt in a vehicle, comprising: support means for connection to a portion of the vehicle, deflection means pivotably mounted relative to said support means and to be engaged by the safety belt, a holder for the safety belt, and means for supporting said holder in spaced relationship to said deflection means, said holder supporting means comprising an arm, means for pivotally mounting said arm adjacent said deflection means, and means pivotally interconnecting said arm and said deflection means so that upon pivoting of said arm said deflection means pivots in the same direction as said arm.

2. A deflection device according to claim 1, wherein said interconnecting means includes means for pivoting said deflection means by an angle smaller than that of said arm.

3. A deflection device according to claim 2 wherein said interconnecting means comprises toothed segments respectively connected to said arm and said deflection means, an intermediate gear in engagement with both said segments, the segment connected to said arm having a smaller radius than the segment connected to said deflection means.

4. A deflection device according to claim 2, wherein said interconnecting means pivots said arm and deflection means in a plane substantially parallel to said support means, and means for pivoting said arm in a plane transverse to said first-mentioned plane.

5. A deflection device according to claim 2, comprising spring means biasing said arm in a direction increasing the distance between said arm and said deflection means.